United States Patent [19]

Sugiyama et al.

[11] 4,429,335
[45] Jan. 31, 1984

[54] ROTARY RECORDING MEDIUM REPRODUCING APPARATUS CAPABLE OF PERFORMING SPECIAL REPRODUCTION

[75] Inventors: Hiroyuki Sugiyama, Isehara; Masaki Sakurai, Yokohama; Ryuzo Abe, Yokohama; Yasuhiro Yusa, Fujisawa; Kenji Yoshihara, Chiba, all of Japan

[73] Assignee: Victor Company of Japan, Ltd., Yokohama, Japan

[21] Appl. No.: 286,667

[22] Filed: Jul. 24, 1981

[30] Foreign Application Priority Data

Jul. 28, 1980 [JP] Japan .............................. 55-103271

[51] Int. Cl.$^3$ .............................................. H04N 5/76
[52] U.S. Cl. .................................. 358/342; 360/10.1; 358/312
[58] Field of Search ................. 369/50, 111, 215, 221, 369/33; 358/312, 342; 360/10.1, 75, 78; 200/11 D, 11 DA, 11 J, 11 G, 11 TW

[56] References Cited

U.S. PATENT DOCUMENTS 3,566,049 2/1971 Wright ........................ 200/11 TW
4,331,976 5/1982 Kinjo ..................................... 369/44
4,340,907 7/1982 Hirota .................................... 369/47

*Primary Examiner*—Alan Faber
*Attorney, Agent, or Firm*—Louis Bernat

[57] ABSTRACT

A reproducing apparatus is capable of performing special reproduction of information signals recorded on a rotary recording medium. The information signals are recorded in either spiral track turns or concentric tracks. The reproducing apparatus comprises a detector for generating a rotation detection signal having a frequency which varies proportionally to the rotational speed of the rotary recording medium. A special signal generator generates a special reproduction synchronizing signal and a generator generates an external control signal based on a signal which is obtained by variably controlling the frequency of the special reproduction synchronizing signal. A manual switch varies the frequency of the special reproduction synchronizing signal by controlling the control signal generator responsive to an output code signal corresponding to a position of the manual switch. The manual switch is positioned at a predetermined neutral position to produce the external control signal once every one rotation of the rotary recording medium, to repetitively reproduce the same track. The manual switch varies the frequency of the external control signal to vary, with predetermined steps, a speed of picture motion of the reproduced information signal, corresponding to positions of the manual switch.

5 Claims, 15 Drawing Figures

FIG. 8

| POSIT | CODE | REP MODE |
|---|---|---|
| 105h | 0 0 1 1 | 65 |
| 105g | 1 0 1 1 | 33 |
| 105f | 1 1 1 1 | 17 |
| 105e | 0 1 1 1 | 9 |
| 105d | 0 1 0 1 | 5 |
| 105c | 1 1 0 1 | 2 |
| 105b | 1 0 0 1 | 1 |
| 105a | 0 0 0 1 | $\frac{1}{16}$ |
| 105 | 0 0 0 0 | 0(STILL) |
| 105i | 1 0 0 0 | $-\frac{1}{16}$ |
| 105j | 1 1 0 0 | -1 |
| 105k | 0 1 0 0 | -3 |
| 105l | 0 1 1 0 | -7 |
| 105m | 1 1 1 0 | -15 |
| 105n | 1 0 1 0 | -31 |
| 105o | 0 0 1 0 | -63 |

↑ FORWARD

↓ BACKWARD

ROTARY RECORDING MEDIUM REPRODUCING APPARATUS CAPABLE OF PERFORMING SPECIAL REPRODUCTION

BACKGROUND OF THE INVENTION

The present invention generally relates to rotary recording medium reproducing apparatuses capable of performing special reproduction, and more particularly to a rotary recording medium reproducing apparatus capable of changing over and selecting a plurality of predetermined changed speed reproduction speed by simple switching operation.

A new information signal recording and/or reproducing system has been proposed in a United States Patent Application Ser. No. 785,095 entitled "INFORMATION SIGNAL RECORDING SYSTEM" filed Apr. 6, 1977, now U.S. Pat. No. 4,331,976, of which the assignee is the same as that of the present application. According to this proposed system, the recording system forms pits in accordance with the information signal being recorded along a spiral track on a flat disc shaped recording medium (hereinafter referred to as disc), without forming a groove therein. In this reproducing system, a reproducing stylus traces over along this track thereby to reproduce the recorded information signal in response to variations in the electrostatic capacitance.

In this system, since a groove for guiding the reproducing stylus is not provided on the disc, pilot or reference signals should be recorded on or in the vicinity of a track of the information signal, such as a video signal, on the disc. Upon reproduction, the reference signals are reproduced together with the video signal. Tracking servo control is carried out so that the reproducing stylus accurately traces along the track in response to the reproduced reference signals.

By the use of this previously proposed system, there is no possibility whatsoever of the reproducing stylus or the disc being damaged since the recording track has no groove. The stylus can trace the same portion of the track repeatedly many times, whereby a special reproduction such as still, slow-motion, or quick-motion reproduction becomes possible.

Thus, in a United States Patent Application Ser. No. 4,813 entitled "SPECIAL REPRODUCING SYSTEM IN AN APPARATUS FOR REPRODUCING VIDEO SIGNALS FROM A ROTARY RECORDING MEDIUM" filed Jan. 19, 1979, now U.S. Pat. No. 4,340,907, of which the assignee is the same as that of the present application, a special reproducing system in a disc reproducing apparatus was proposed which is capable of performing a special reproduction in which a picture having a motion different from that upon normal reproduction is obtained in an excellent manner.

The special reproducing system comprises a reproducing element for tracing the track of the disc and picking up the recorded signal, a tracking control mechanism for operating in response to kick pulses applied thereto to cause the reproducing element to shift to an adjacent track turn of the spiral track, and a kick pulse generating circuit for generating kick pulses with timings corresponding to the vertical blanking period positions of the recorded video signal, where the kick pulses are of a number corresponding to an operational mode for carrying out a special reproduction differing from normal reproduction at every rotational period of the rotary recording medium, and supplying the kick pulses to the tracking control mechanism. The reproducing element is shifted to an adjacent track turn within the vertical blanking period of the recorded video signal, by the tracking control mechanism responsive to the kick pulses.

Accordingly, the noise introduced when the reproducing element moves to an adjacent track does not appear in the picture, and a special reproduction such as still reproduction, slow-motion and quick-motion reproduction in the forward direction, and normal-speed, slow-motion, and quick-motion reproduction in the backward direction can be performed in which a fine picture is obtained.

However, in the conventional apparatus, manipulation switches were provided according to respective reproduction modes such as still reproduction, slow-motion reproduction of a predetermined speed ratio, and quick-motion reproduction of a predetermined speed ratio. Therefore, the arrangement on the manipulation panel became complex, and the manipulation switches were difficult to manipulate. Particularly when the number of predetermined speed ratios which are to be set is large, the number of manipulation switches increases, and the above described disadvantage becomes notable.

Moreover, operations are performed to move the reproducing stylus from the position where the reproducing stylus makes contact with the disc and stop at a position on the disc where a video signal of a desired picture content is recorded, within a short period of time, while monitoring the image in the reproduced picture screen. This kind of operation was very difficult to perform by use of the above described conventional apparatus. In addition, there was a disadvantage in that the reproducing stylus could not be stopped accurately at the desired position on the disc.

SUMMARY OF THE INVENTION

Accordingly, a general object of the present invention is to provide a novel and useful rotary recording medium reproducing apparatus capable of performing special reproduction, in which the above described disadvantages have been overcome.

Another and more specific object of the present invention is to provide a rotary recording medium reproducing apparatus capable of performing special reproduction, constructed to forcibly change the track on which a reproducing stylus traces and reproduces by use of an external control signal, where the reproducing stylus relatively slides against a rotary recording medium in which an information signal is recorded in spiral or concentric tracks, to read out and reproduce the recorded information signal. In the rotary recording medium reproducing apparatus according to the present invention, a special reproduction synchronizing signal for generating the above external control signal is produced from the reproduced signal reproduced by the reproducing stylus and a rotation detection signal of the above rotary information recording medium, the frequency of the special reproduction synchronizing signal is varied according to the output signal of a manual switch which is respective of the manipulating position of the manual switch, and the above external control signal is generated based on the special reproduction synchronizing signal whose frequency has been varied in order to forcibly change the track on which the reproducing stylus is tracing and reproducing. The reproduction speed ratio of the reproduced signal is varied in steps according to each manipulating position of the manual switch which resultingly produces the above external control signal once every one rotation of the rotary information recording medium, so that the manual switch is at a predetermined returned position to perform still picture reproduction when the manual switch is not manipulated. The desired picture is obtained by monitoring the reproduced picture reproduced from the rotary information recording medium. According to the apparatus of the present invention, the desired picture can be obtained by a simple operation performed by the operator. Further, the desired picture can be searched at a desired reproduction speed. In addition, the search for the desired picture can be performed at a high speed, since the reproduction speed ratio can be varied in steps according to the preference of the operator.

Still another object of the present invention is to provide a rotary recording medium reproducing apparatus capable of performing special reproduction in which the manual switch for varying the above reproduction speed ratio is constructed such that a digital signal in conformity with the Gray code is produced according to the manipulating position of the manual switch, and the manipulating position of the manual switch is selected at the predetermind return position described above for performing slow-motion reproduction in a case where each bit of the Gray code is of the logical value zero ("0"). According to the apparatus of the present invention, a predetermined digital signal can be produced without introducing manipulation errors of the manual switch. Moreover, the reproduction speed ratio can be allocated efficiently in cases where forward reproduction or backward reproduction is performed. Furthermore, reproduction can immediately be performed in terms of frames every time the manual switch is manipulated, since the apparatus is constructed to immediately generate the external control signal and perform reproduction in terms of frames when the manual switch is manipulated from the predetermined returned position unto a predetermined position. Therefore, there is an advantage in that reproduction can be performed in terms of frames, which is suited with the operator's manipulation sense.

Other objects and further features of the present invention will be apparent from the following detailed description when read in conjunction with the accompanying drawings.

BRIEF DESCRIPTION OF THE DRAWINGS

FIG. 8 is a diagram showing the relationship between the Gray code of the manipulation switch shown in FIG. 7 and the multiplying speed ratio in a tubular form;

DETAILED DESCRIPTION

Figure 1:
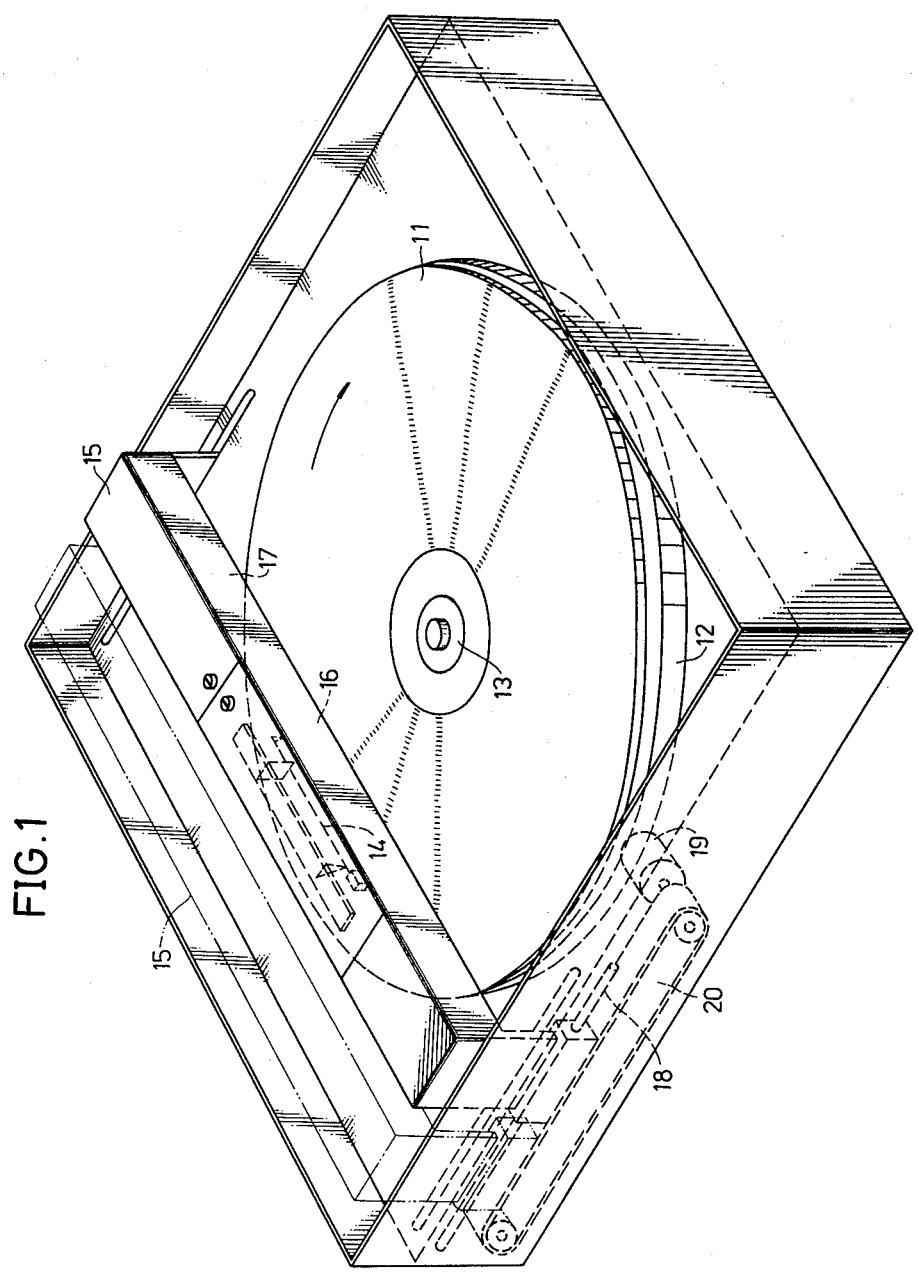
FIG. 1 is a perspective view showing an example of a rotary recording medium reproducng apparatus.

The general features of the exterior of a reproducing apparatus for reproducing a rotary recording medium, in which a special reproducing system according to the invention can be applied, is illustrated in FIG. 1. In this apparatus, a disc 11 is a rotary recording medium having a video signal recorded thereon. The disc 11 is set on and clamped onto a turntable 12 by a clamper 13. The disc 11 is thus rotated unitarily with the turntable 12 at a rotational speed of 900 rpm, for example.

A signal pickup device 14, used as a reproducing transducer, is mounted at a re-entrant cylindrical cavity resonator 16 within a carriage 15. The pickup is connected to a central conductor (not shown) of the resonator. The central conductor is electro-magnetically connected to a high-frequency oscillator 17. This organization is well known. The carriage 15 is disposed horizontally above the turntable 12, and is guided at its ends by a pair of parallel horizontal guide bars 18 (only one shown). This carriage 15, driven by an endless belt 20 which is driven by a motor 19, moves continuously and linearly in a direction from the outer peripheral part to the inner peripheral part at a speed equal to the distance of one track pitch per revolution of the turntable 12, during a forward normal reproducing mode. The carriage movement is in synchronism with the rotation of the turntable. As a result of this movement of the carrier 15, a stylus of the signal pickup device 14 travels radially across the rotating disc 11 and relatively traces the spiral track of the disc 11.

Figure 2:
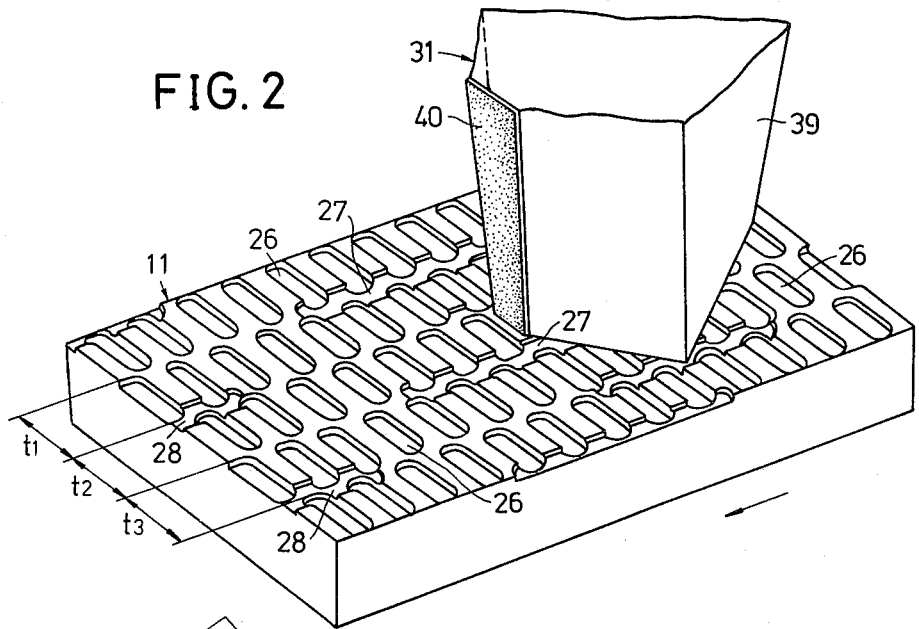
FIG. 2 is a perspective view, on a large scale, showing a part of a rotary recording medium together with a tip part of a reproducing stylus.

A video signal is recorded on a spiral track with pits formed on the disc 11 responsive to the information contents of the signal. One part of this track is shown in an enlarged scale in FIG. 2. In FIG. 2 track turns of a single continuous spiral track, corresponding to each revolution of the disc 11, are designated by $t_1, t_2, t_3 \ldots$. Each track turn is constituted by the formation of pits 26 of the main information signal along the plane track path and has no stylus guide groove formed therein. With respect to one track turn $t_1$, in every horizontal scanning period (H) at a position corresponding to the horizontal blanking period, pits 27 of the first reference signal fp1 are formed on one lateral side of the track as viewed in the track path direction. Pits 28 of the second reference signal fp2 are formed on the other side of the track.

In an intermediate position between the centerlines of adjacent track turns, only pits of either one kind of the pits 27 and 28 of the above reference signals fp1 and fp2 are formed, and with respect to one track, moreover, the sides on which the pits 27 and 28 are formed are alternated for every track turn. That is, if pits 27 and 28 are respectively formed on the right and left sides of one track turn, for example, pits 28 and 27 will respectively be formed on the right and left sides of each of the adjacent track turns.

Figure 3:
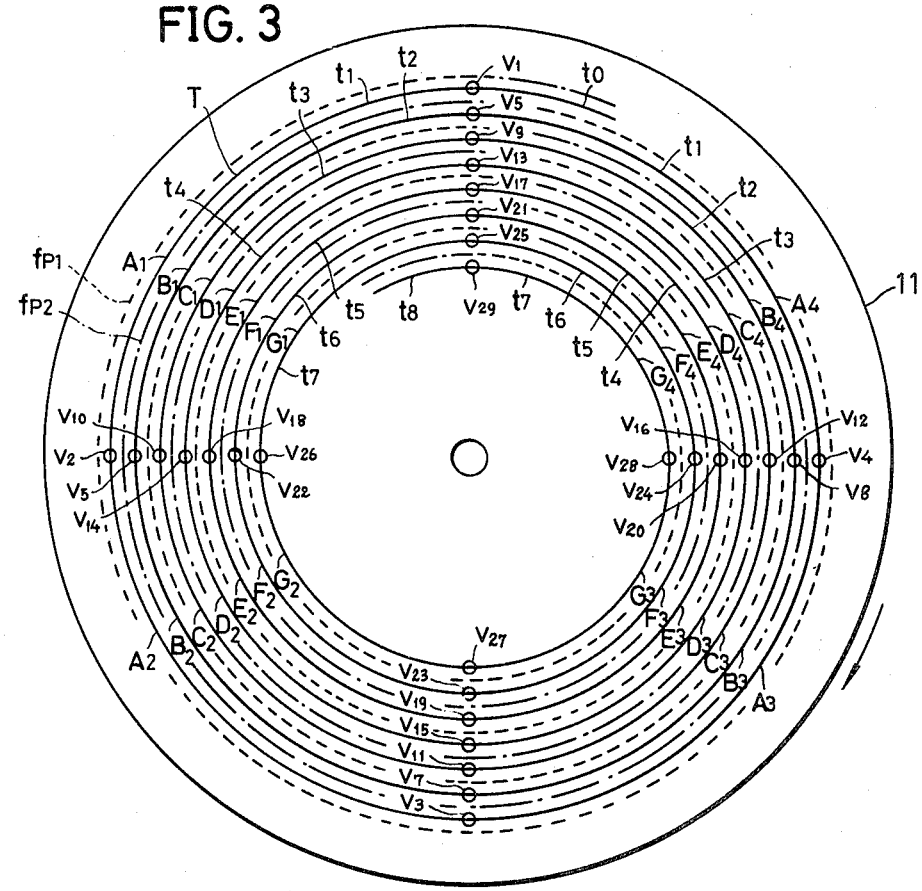
FIG. 3 is a diagrammatic plan view indicating vertical synchronizing signal positions on a track pattern of a rotary recording medium.

On the disc 11, as indicated in FIG. 3, a video signal is recorded along a spiral track T for two frames, that is, four fields, per one revolution of the disc. In FIG. 3, the tracks of the reference signal fp1 is shown by dotted lines while the reference signal fp2 is shown by one-dot chain lines. The positions of the vertical synchronizing signals of respective fields are designated by reference characters V1, V2, V3, ..., and the successive track parts corresponding to one revolution of the disc of a single spiral track I will respectively be designated by track turns $t_1, t_2, t_3, \ldots$. Furthermore, a third reference signal fp3 is recorded at the starting end positions V1, V5, V9, ... of each track turns $t_1, t_2, t_3, \ldots$, that is, at positions where the reference signals fp1 and fp2 change over. A video signal of four fields, namely A1, A2, A3, and A4, is recorded in the track $t_1$.

Figure 4:
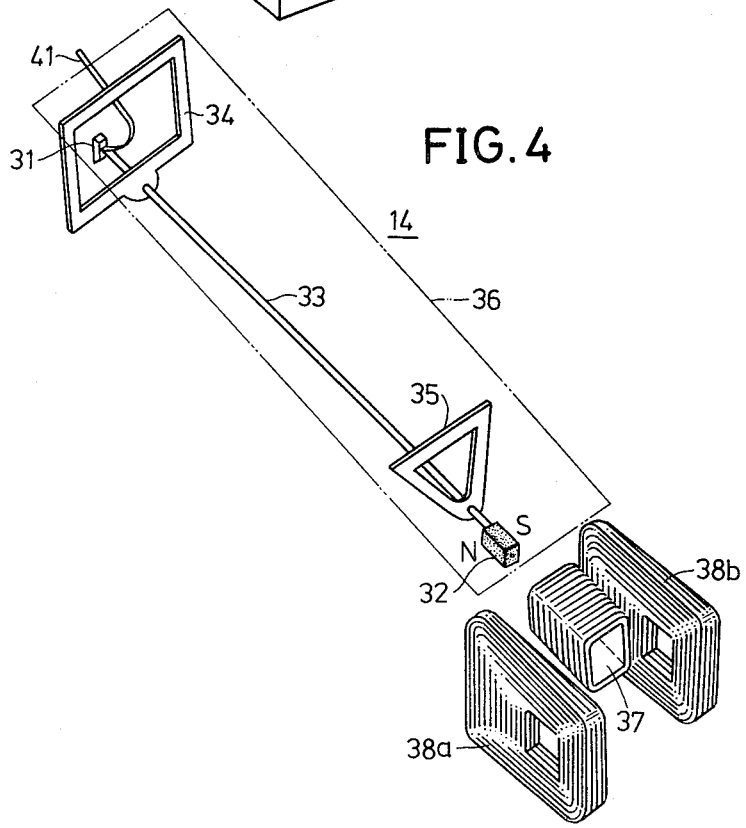
FIG. 4 is an exploded perspective view showing an example of a reproducing transducer in the reproducing apparatus shown in FIG. 1.

One example of the signal pickup device 14 indicated in FIG. 1 will now be described with reference to FIG. 4. This pickup device 14 has a relatively long cantilever arm 33 provided with a reproducing stylus 31 at its distal free end and a permanent magnet member 32 at its proximal root end. This cantilever arm 33 is supported by dampers 34 and 35 which are fixed to the lower surface of a support plate 36.

The support plate 36 is fitted into and held by a holding structure. A coil 37 used for tracking, and a pair of coils 38a and 38b used for jitter compensation disposed on both sides of the coil 37, are fixed to the lower surface of the support plate 36. The above permanent magnet member 32 is fitted into the coil 37 with gaps formed therebetween.

The tip end of the reproducing stylus 31 has a shape shown in FIG. 2. The reproducing stylus 31 is constituted by a stylus structure 39 having a disc tracing surface which has a width greater than a track width, and an electrode 40 fixed to the rear face of the stylus structure 39. The electrode 40 is connected with a metal ribbon 41, as shown in FIG. 4. As the reproducing stylus 31 traces along a track on the disc 11 rotating in a direction indicated by arrow, the video signal recorded thereon by the formation of pits is reproduced as variations in the electrostatic capacitance between the surface of the disc 11 and the electrode 40 of the reproducing stylus 31.

Figure 5:
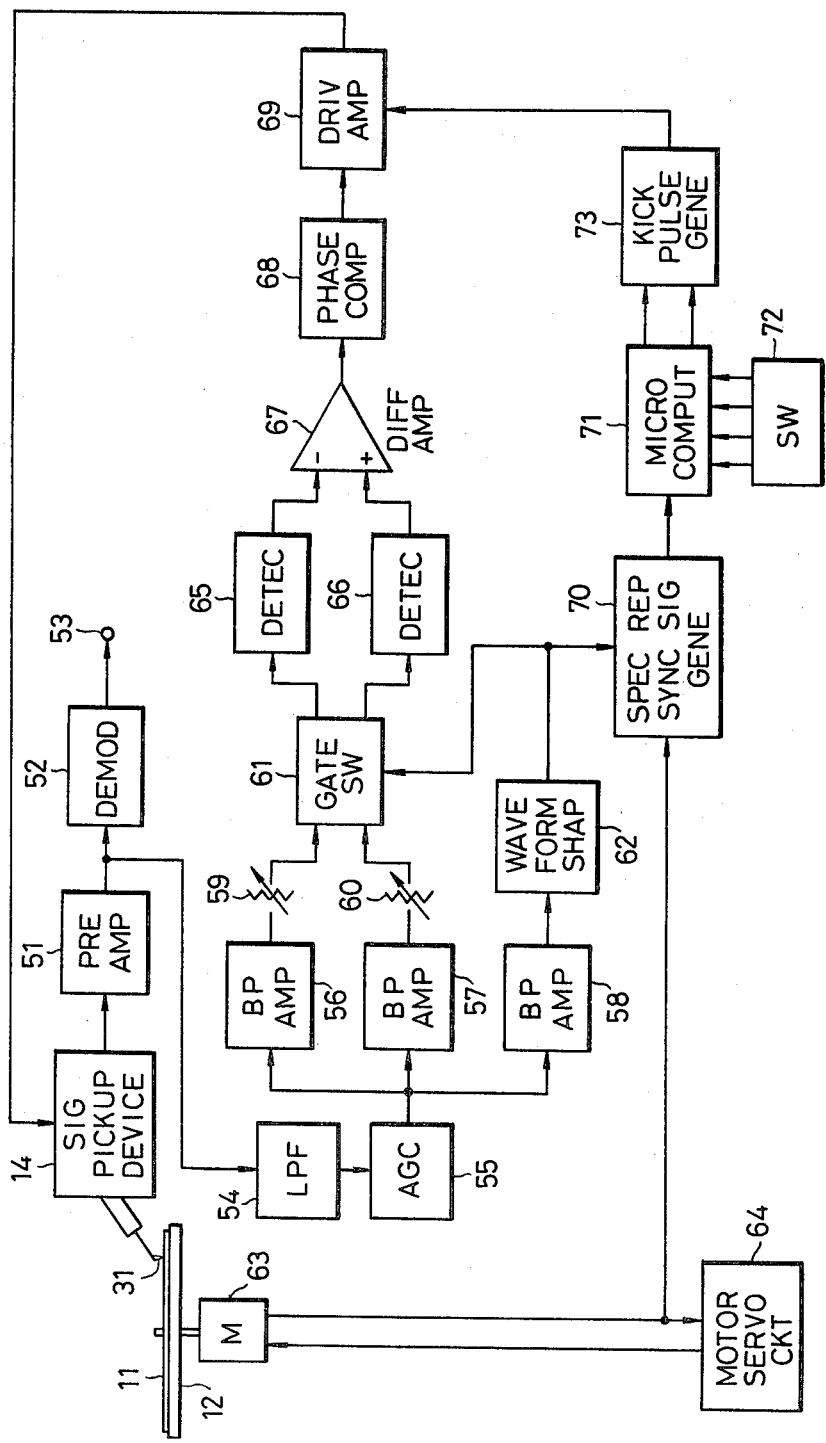
FIG. 5 is a systematic block diagram showing an embodiment of a rotary recording medium reproducing apparatus according to the present invention.

In the system shown in FIG. 5, a reproduced signal picked up from the disc 11 as minute variations in the electrostatic capacitance by the reproducing stylus 31 of the signal pickup device 14, is supplied to a preamplifier 51 having a resonant circuit. The resonance frequency of the resonant circuit varies in response to this variation in the electrostatic capacitance, and is formed into a signal of a desired level. The resulting output of the preamplifier 51, is demodulated into the original video signal by a demodulator 52 and is obtained as an output through an output terminal 53.

The output signal of the preamplifier 51 is supplied to a lowpass filter 54 wherein the reference signals fp1, fp2, and fp3 are separated. The output reference signals pass through an automatic gain control circuit 55 and are respectively supplied to amplifiers 56, 57, and 58. Here, each of the amplifiers 56, 57, and 58 is a kind of a band-pass amplifier respectively designed to have steep passing frequency characteristics at only the respective frequency fp1, fp2, and fp3. As a result, the signals having frequencies fp1 and fp2 are respectively separated and obtained from the amplifiers 56 and 57. These signals respectively pass through level adjustors 59 and 60, wherein the levels of the signals are adjusted. The resulting signals are then supplied to a gate switching circuit 61.

The reference signal fp3 separated and amplified at this band-pass amplifier 58, is supplied to a waveform shaping circuit 62 comprising a Schmitt circuit. The signal thus supplied to the waveform shaping circuit 62 undergoes waveform-shaping so that the signal is not affected by noise and other influences. The resulting output are supplied as switching pulses to the gate switching circuit 61, and to a special reproduction synchronizing signal generator 70 which will be described hereinafter.

The gate switching circuit 61 performs switching of the reference signals fp1 and fp2 every one revolution period of the disc 11 upon normal reproduction, in response to the above switching pulses applied thereto. Hence, due to the switching pulses which reverse polarity every two frames (1/15 seconds), the signals fp1 and fp2 are always respectively supplied to detecting circuits 65 and 66 with predetermined polarities, from the gate switching circuit 61.

The detecting circuits 65 and 66 detect the envelopes of their respective input reference signals and convert the input reference signals into DC voltages. These DC voltages are then supplied to a differential amplifier 67. The differential amplifier 67 compares the output signals of the two detecting circuits 65 and 66 which vary in response to the reproduced levels of the reference signals fp1 and fp2, and generates an output tracking error signal which indicates the tracking error direction and the error quantity. This error signal passes through a phase compensation circuit 68 and is further amplified to a specific level by a driving amplifier 69.

The output signal of the driving amplifier 69 is applied to the coil 37 of the signal pickup device 14 as a control signal, to control the signal pickup device 14. As a result, the permanent magnet member 32 undergoes displacement within the coil 37, and, accompanied by this movement of the coil 37, the cantilever 33 also undergoes displacement, whereby the reproducing stylus 31 is tracking controlled so that the above tracking error signal becomes zero, that is, so that the stylus 31 correctly traces over the track T of the disc 11.

Figure 6:
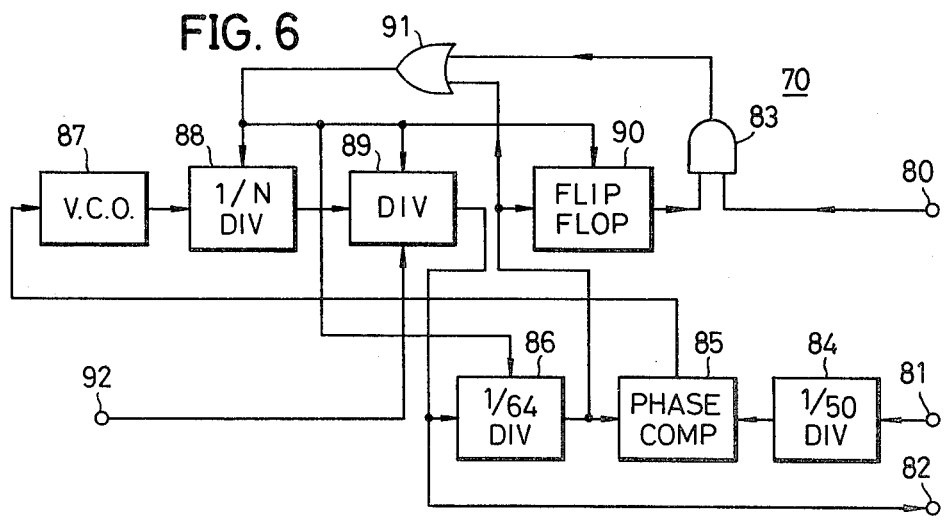
FIG. 6 is a concrete systematic block diagram showing an embodiment of an essential part of the block system shown in FIG. 5.

The special reproduction synchronizing signal generator 70 has a construction indicated in the systematic block diagram shown in FIG. 6, for example. The reference signal fp3 having a frequency of 15 Hz from the waveform shaping circuit 62 which is applied to an input terminal 80, is applied to one input terminal of an AND-gate 83. A motor 63 which drives the above turntable 12 has a rotation detector built therein, and an output motor synchronizing signal $f_{FG}$ has a frequency of 749.25 Hz, for example. This signal $f_{FG}$ is supplied to a 1/50 frequency divider 84 wherein the signal supplied thereto is frequency divided into 1/50 the original frequency, through an input terminal 81. The frequency-divided signal from the 1/50 frequency divider 84 is supplied to a phase comparator 85, wherein the phase of the frequency-divided signal is compared with the phase of the signal obtained from a 1/64 frequency divider 86. An output phase difference signal of the phase comparator 85 is supplied to a voltage controlled oscillator (VCO) 87, to control the oscillation frequency. The free-running oscillation frequency of the VCO 87 is selected at 5.156 MHz, for example.

The output signal of the VCO 87 is frequency-divided so that the frequency becomes 1/256 the original frequency at a 1/N frequency divider 88 (where N is an integer), and then supplied to a frequency divider 89 wherein the signal supplied thereto is further frequency-divided into 1/21 the original frequency. The frequency dividing ratio of this frequency divider 89 is changed over according to a signal obtained through an input terminal 92. Upon reproduction of a disc recorded with a color video signal of the PAL system or the SECAM system, for example, the frequency dividing ratio of the frequency divider 89 is set at 1/25. An output signal of the frequency divider 89 is supplied to the 1/64 frequency divider 86 wherein the frequency of the signal supplied thereto is frequency divided into 1/64, and then supplied to the above described phase comparator 85. On the other hand, the output signal of the 1/64 frequency divider 86 is supplied to a flip-flop 90 and to one input terminal of an OR-gate 91. An output of the flip-flop 90 is applied to the AND-gate 83 together with the reference signal fp3 obtained through the input terminal 80. An output of the above AND-gate 83 is applied to the other input terminal of the OR-gate 91. Further, the output of the OR-gate 91 is applied to frequency dividers 86, 88, and 89 and the flip-flop 90 as reset pulses.

Accordingly, a total of 64 pulses (having a repetition frequency of approximately 959 Hz) are obtained every one rotation of the disc 11 from the frequency divider 89, in synchronism with the reference signal fp3, as a special reproduction synchronizing signal $f_f$, through the output terminal 82 of the special reproduction synchronizing signal generator 70. When the reference signal fp3 is not obtained when it actually should be obtained, the output of the frequency divider 86 is supplied to the frequency dividers 86, 88, and 89 and the flip-flop 90 through the OR-gate 91, to reset these frequency dividers 86, 88, and 89 and the flip-flop 90. On the other hand, when noise is introduced to the input terminal 80 in a case where the reference signal fp3 should not be obtained, noise is prevented from being supplied to the OR-gate 91 by the AND-gate 83.

The special reproduction synchronizing signal $f_f$ thus obtained, is applied to a micro-computer 71 shown in FIG. 5. This micro-computer 71 is in synchronism with the special reproduction synchronizing signal $f_f$, and produces pulses having intervals respective of an output signal of a manipulation switch 72. These pulses thus produced by the micro-computer 71 is supplied to a kick pulse generator 73.

Figure 7:
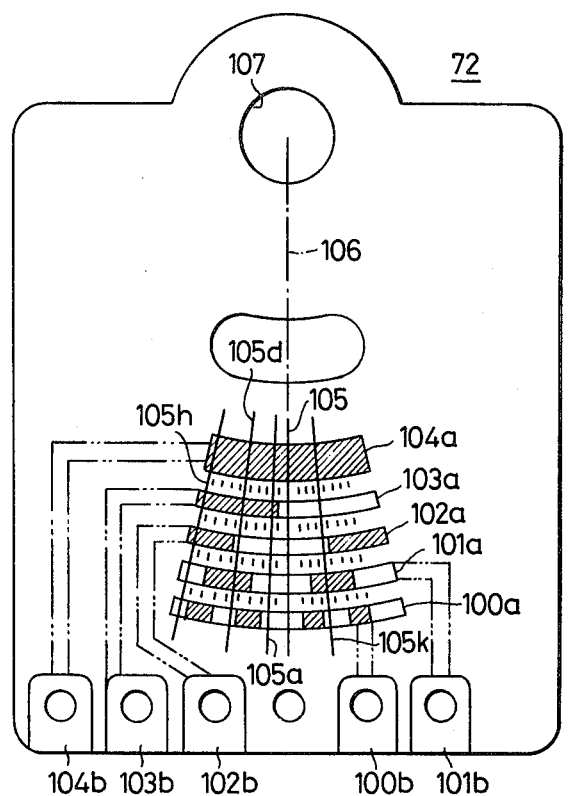
FIG. 7 is a plan view showing a concrete construction of an embodiment of a manipulation switch within the block system shown in FIG. 5.

The manipulation switch 72 has a configuration shown in FIG. 7, for example. The manipulation switch 72 has fixed contact parts 100a, 101a, 102a, 103a, and 104a, and terminal parts 100b, 101b, 102b, 103b, and 104b which are respectively connected to the corresponding fixed contact parts 100a through 104a. In FIG. 7, shaded parts of the fixed contact parts 100a through 104a indicate conductive parts, and blank parts of the fixed contact parts 100a through 104a indicate non-conductive parts. In addition, a manipulation part 106 having a movable contact member 105 substantially indicated by a solid line, is provided freely rotatable around a hole 107. As the manipulation part 106 rotates, the movable contact member 105 slides over the fixed contact parts 100a through 104a. Accordingly, the conductive parts of the fixed contact parts 100a through 104a at the rotated position of the manipulation part 106 is connected by the movable contact member 105. When the operator releases the manipulation part 106 to put the manipulation part 106 in a non-operational state, the manipulation part 106 is returned to a neutral position indicated by a one-dot chain line in FIG. 7 from the above rotated position, due to a force exerted by a spring (not shown).

The patterns of the conductive parts of the fixed contact parts 100a through 103a, are established by the Gray code in accordance with the rotated position of the movable contact member 105. The fixed contact part 104a comprises a conductive part throughout the entire area of the fixed contact part 104a. Hence, when the conductive parts of the fixed contact parts 100a through 103a which respectively make contact according to the rotated position of the movable contact member 105 are designated by "1", and the non-conductive parts are designated by "0", the relationship between the Gray code described by these "1" and "0" and the special reproduction mode which will be described hereinafter, becomes as shown in FIG. 8. The fixed contact parts 100a, 101a, 102a, and 103a respectively form the first, second, third, and fourth bits. Accordingly, in a state where the movable contact member 105 is at the neutral position, the movable contact member 105 makes contact with the non-conductive parts of the fixed contact parts 100a through 103a, and the code becomes "0,0,0,0". As will be described hereinafter, still picture reproduction is performed in this state.

When the manipulation part 106 is rotated by one step towards the left hand side (clockwise) in FIG. 7 from the neutral position, the movable contact member 105 makes contact with the non-conductive parts of the fixed contact parts 100a through 103a and with the conductive part of the fixed contact part 104a. The code in this case accordingly becomes "0,0,0,1", and a 1/16-speed slow-motion reproduction in the forward direction is performed as can be seen from FIG. 8. Similarly, as the manipulation part 106 is rotated towards the left hand side in FIG. 7 in steps, the code becomes "1,0,0,1" to perform normal-speed reproduction in the forward direction, "1,1,0,1" to perform double-speed quick-motion reproduction in the forward direction, "0,1,0,1" to perform quintuple-speed quick-motion reproduction in the forward direction, - - - , and "0,0,1,1" to perform 65-times-speed quick-motion reproduction in the forward direction. On the other hand, when the manipulation part 106 is rotated towards the right hand side counterclockwise in FIG. 7 in steps, the code becomes "1,0,0,0" to perform 1/16-speed slow-motion reproduction in the backward direction, "1,1,0,0" to perform normal-speed reproduction in the backward direction, "0,1,0,0" to perform triple-speed quick-motion reproduction in the backward direction, - - - , and "0,0,1,0" to perform 63-times-speed quick-motion reproduction in the backward direction. In FIG. 8, the negative sign appearing in the right column indicates that the reproduction mode is a backward reproduction.

The terminal part 104b connected to the fixed contact part 104a is applied with a predetermined voltage. For example, when the movable contact member 105 is at a rotated position indicated by 105d, the code becomes "0,1,0,1", and the voltage at the terminal part 104b is obtained through the terminal parts 101b and 103b. Therefore, quintuple-speed quick-motion reproduction in the forward direction is thus performed.

The code of the conductive contact parts which is respective of the rotated position of the movable contact member 105, is not limited to the above Gray code, however, since only one bit differ between adjacent codes in the Gray code, the present embodiment using the Gray code is a desirable embodiment in that erroneous operations can be effectively prevented using the characteristic of the Gray code.

Each output signal at the terminal parts 100b through 103b of the manipulation switch 72 having the above described construction, is respectively applied to the micro-computer 71 shown in FIG. 5. The micro-computer 71 produces a positive polarity pulse a shown in FIG. 9(A) through a first output terminal, and a negative polarity pulse b shown in FIG. 9(B) through a second output terminal, with a predetermined period in accordance with the signal of the Gray code obtained from the manipulation switch 72. These positive polarity pulse a and the negative polarity pulse b are formed so that these pulses are alternately produced. The order in which these pulses are produced differs according to the direction towards which the reproducing stylus 31 is forcibly moved.

Figure 9:
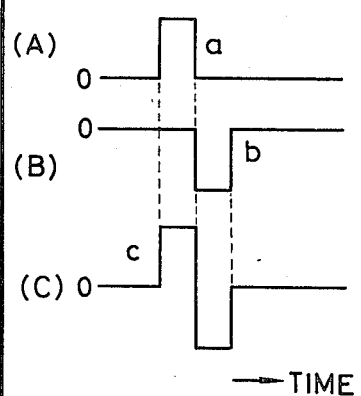
FIGS. 9(A) through 9(C) are diagrams respectively showing signal waveforms for explaining the operation of the essential part of the block system shown in FIG. 5.

The kick pulse generator 73 shown in FIG. 5 produces a kick pulse shown in FIG. 9(C) having a double-integral waveform of a step waveform. This kick pulse thus produced, is supplied to the tracking coil 37 of the signal pickup device 14, through the driving amplifier 69. Accordingly, the reproducing stylus 31 is forcibly moved by one track pitch towards the outer peripheral direction or the inner peripheral direction of the disc 11 (this forced movement of the reproducing stylus 31 by one track pitch will hereinafter be referred to as a "kick").

Figure 10:
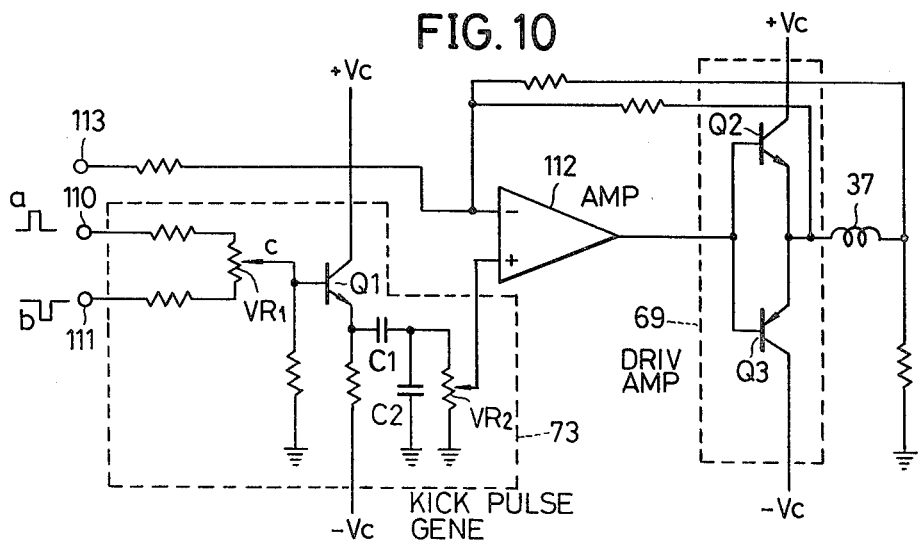
FIG. 10 is a concrete systematic circuit diagram showing an embodiment of another essential part of the block system shown in FIG. 5.

FIG. 10 shows an embodiment of a concrete circuit of the above kick pulse generator 73 and the driving amplifier 69. The pulses a and b shown in FIGS. 9(A) and 9(B) obtained from the micro-computer 71 which are respectively applied to input terminals 110 and 111, passes through a slider of a variable resistor VR1 and is converted into an added pulse c shown in FIG. 9(C). This pulse c thus obtained, is applied to the base of an NPN-transistor Q1 as a kick pulse.

The kick pulse obtained through the emitter of the above transistor Q1 which is subjected to impedance-conversion, passes through a circuit comprising capacitors C1 and C2, and is then adjusted of the level by a variable resistor VR2 in order to accurately kick the reproducing stylus by one track pitch. The kick pulse whose level is thus adjusted, is supplied to a non-inverting input terminal of an amplifier 112. The tracking difference signal obtained from the phase compensation circuit 68 is supplied to an inverting input terminal of the amplifier 112, through an input terminal 113.

The kick pulse obtained from the amplifier 112 is applied to the bases of an NPN-transistor Q2 and a PNP-transistor Q3. Thus, the kick pulse is converted into a signal of a predetermined voltage and flows through the tracking coil 37 of the signal pickup device 14 as a driving current, to kick the reproducing stylus 31.

When the operator manually rotates the manipulation part 106 of the manipulation switch 72 towards the clockwise direction in FIG. 7, for example, the reproduction speed ratio of reproduction in the forward direction increases in steps according to the rotated position of the manipulation part 106. In a case where the movable contact member 105 is at a position indicated by 105d in FIG. 7, a pulse in synchronism with a pulse having a frequency which is obtained by frequency-dividing the special reproduction synchronizing signal $f_I$, is produced from the micro-computer 71. Therefore, a kick pulse is produced for kicking the reproducing stylus 31 towards the inner peripheral direction of the disc 11 at four positions within one rotation of the disc 11.

Figure 11:
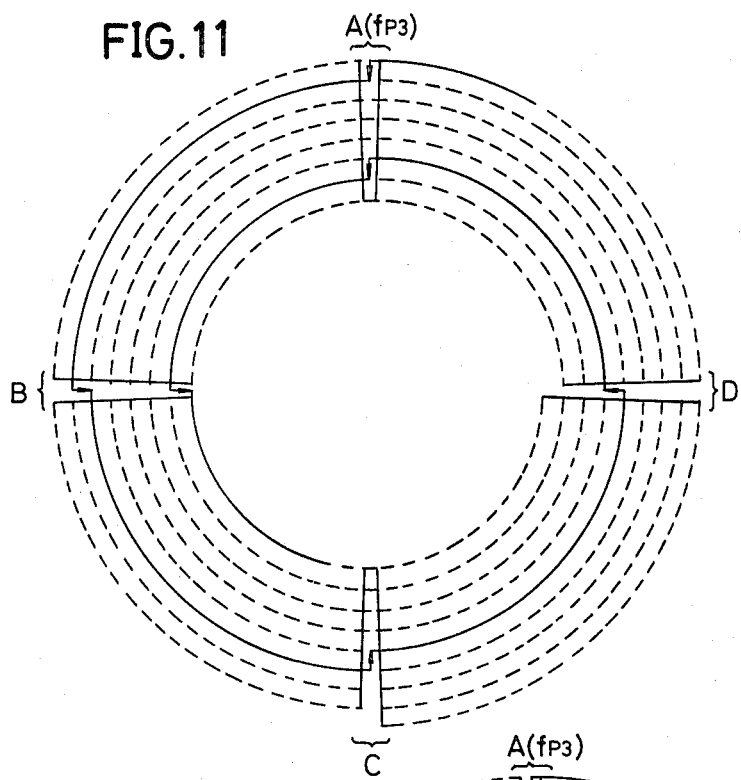
FIG. 11 is a diagram showing the tracing locus of the reproducing stylus upon quintuple-speed forward reproduction in the reproducing apparatus according to the present invention.
Figure 12:
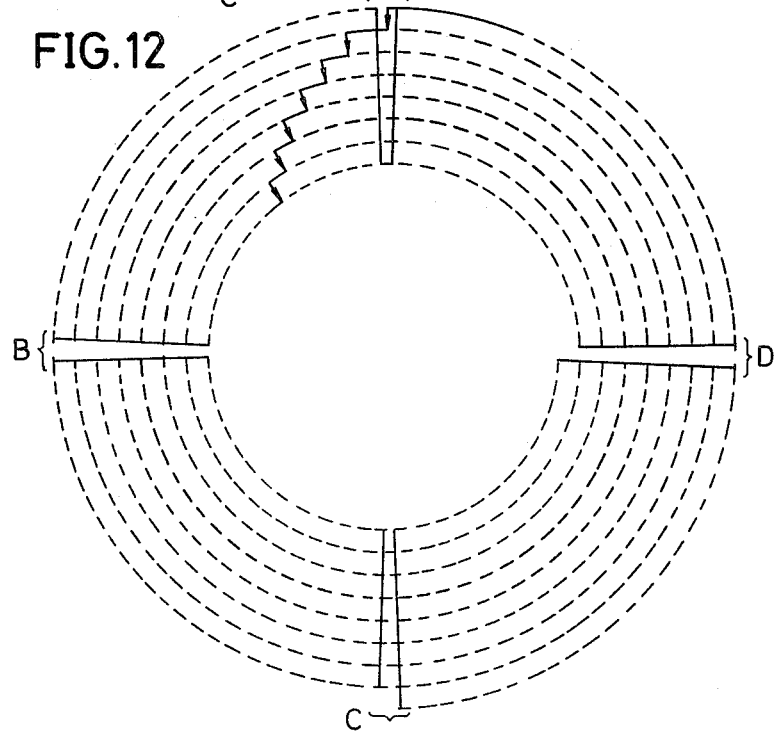
FIG. 12 is a diagram showing the tracing locus of the reproducing stylus upon sixty-five-times speed forward reproduction in the reproducing apparatus according to the present invention.
Figure 13:
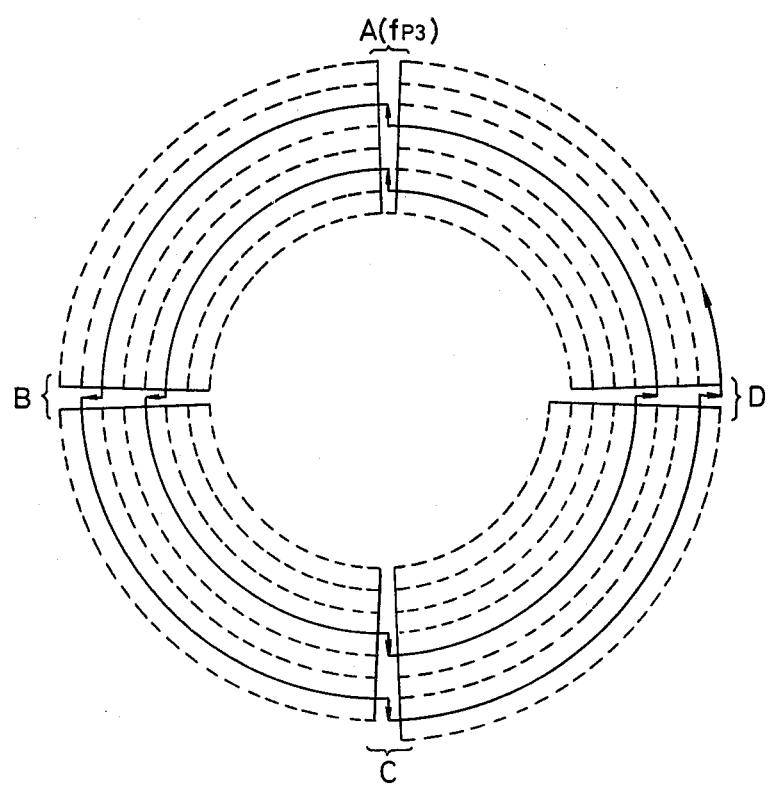
FIG. 13 is a diagram showing the tracing locus of the reproducing stylus upon triple-speed backward reproduction in the reproducing apparatus according to the present invention.

FIG. 11 indicates the tracing locus of the reproducing stylus 31 in the above described state. In FIG. 11 and FIGS. 12 and 13 which will be described hereinafter, parts A, B, C, and D respectively indicate vertical blanking period recorded parts, where the part A is a changeover part between the reference signals fp1 and fp2 which is also the part where the reference signal fp3 is recorded. Further, in these figures, the solid lines indicate the tracing locus of the reproducing stylus 31, and the broken lines indicate the center line of a main track of the part which is not reproduced by the reproducing stylus 31. In the state shown in FIG. 11 where a quintuple-speed reproduction in the forward direction is performed, the reproducing stylus 31 is kicked every time the vertical blanking period recorded parts at four positions are reproduced. Accordingly, in this case, recorded signals at positions which are five tracks after that particular position are reproduced every one rotation of the disc 11. Hence, quintuple-speed reproduction in the forward direction is thus performed, to produce a reproduced picture of a quintuple-speed reproduction in the forward direction.

Next, the frequency dividing ratio at the micro-computer 71 becomes ⅛, ¼, and ½ according to the rotation of the manipulation part 106 of the manipulation switch 72 in the clockwise direction in FIG. 7. In addition, as indicated in FIG. 8, reproduced pictures of 9-times-speed, 17-times-speed, and 33-times-speed reproduction in the forward direction are obtained. When the manipulation part 106 is fully rotated to the limit unto a position where the movable contact member 105 is at a position indicated by 105h in FIG. 7, signals are obtained from the terminal parts 102b and 103b. In this case, the micro-computer 71 does not perform frequency division and produces the special reproduction synchronizing signal $f_I$ as it is. Accordingly, the reproducing stylus 31 is kicked towards the inner peripheral direction of the disc 11 at sixty-four positions every one rotation of the disc 11. The tracing locus of the reproducing stylus 31 in this case is shown in FIG. 12, and a reproduced picture of a 65-times-speed quick-motion reproduction in the forward direction is thus obtained.

As the manipulation switch 72 is operated manually to rotate the manipulation part 106 towards the clockwise direction in FIG. 7, reproduced picture of reproduction in the forward direction is obtained which is of a higher speed. When the manipulation part 106 is gradually rotated towards the counter clockwise direction in FIG. 7 as a reproduced picture in the vicinity of the desired picture is obtained, the speed at which reproduction is performed decreases. Thus, when the operator releases the manipulation part 106 at the time when the reproduced picture is the desired picture, the manipulation part 106 and the movable contact member 105 automatically return to the neutral position in FIG. 7 due to the force exerted by the spring (not shown) and stop at the neutral position. In this state, as clearly seen from FIG. 7, the fixed contact part 104*a* is open-circuited with respect to all the fixed contact parts 100*a* through 103*a*, and thus, no signals are produced through the terminal parts 100*b* through 103*b*. Furthermore, in this state, the micro-computer 71 frequency-divides the special reproduction synchronizing signal $f_I$ so that the frequency is divided into 1/64 the original frequency, and kicks the reproducing stylus 31 towards the outer peripheral direction of the disc 11 at a predetermined vertical blanking period once every one rotation of the disc 11. Therefore, the reproducing stylus 31 repeatedly reproduces the same track in this case, and the desired picture is obtained as a picture of still-motion reproduction. Hence, in a case where the recorded position of the video signal of the desired picture is at a position towards the inner peripheral direction of the disc 11 compared to the position where the reproducing stylus 31 is located, search can be made to find the recorded position of the desired video signal while observing the reproduced picture, by change in the reproduction speed ratio of reproduction in the forward direction in a step manner due to manual operation of the above manipulation switch 72.

In a case where the fixed contact part 104*a* is connected to the fixed contact parts 100*a* and 103*a* (when the Gray code indicated in FIG. 8 is "1,0,0,1"), the kick pulse is not generated. Accordingly, the reproducing stylus 31 is not kicked, and the reproducing stylus 31 does not change the track it is reproducing. Hence, the reproducing stylus 31 traces along the track locus, to perform normal reproduction (reproduction speed ratio is unity).

On the other hand, in a case where the recorded position of a video signal of the desired picture is at a position towards the outer peripheral direction of the disc 11 with respect to the position of the reproducing stylus 31, the manipulation part 106 of the manipulation switch 72 is rotated in the counter clockwise direction in FIG. 7. Accordingly, reproduction is performed in the backward direction, and the reproduction speed ratio increases in a step manner. When a picture in the vicinity of the desired picture is obtained, the manipulation part 106 is rotationally returned towards the clockwise direction. Thus, when the operator releases the manipulation part 106 upon reproduction of the desired picture, still-motion reproduction is automatically performed to reproduce X the desired picture. Hence, search can be performed to obtain the desired picture within a short period of time. In a case where the movable contact member 105 is at a position indicated by 105*k* in FIG. 7 to short-circuit the fixed contact parts 104*a* and 101*a*, the voltage at the terminal 104*b* is obtained only through the terminal part 101*b*. This state corresponds to a state where the Gray code is "0,1,0,0" in FIG. 8. In this state, the micro-computer 71 frequency-divides the frequency of the special reproduction synchronizing signal $f_I$ into 1/16 the original frequency, to produce a kick pulse for kicking the reproducing stylus 31 towards the outer peripheral direction of the disc 11 four times every one rotation of the disc 11 from the kick pulse generator 73. Hence, the tracing locus of the reproducing stylus 31 becomes as indicated by the solid line in FIG. 13, and triple-speed quick-motion reproduction in the backward direction is performed to reproduce the signals at positions which are three tracks before the position where the reproducing stylus 31 is positioned, every one rotation of the disc 11.

Furthermore, in order to kick the reproducing stylus 31 eight, sixteen, thirty-two, or sixty-four times every one rotation of the disc 11, the reproducing stylus 31 must be kicked at positions other than the vertical blanking periods A, B, C, and D. Accordingly, noise is introduced in this case, and upon 65-times-speed reproduction in the forward direction, for example, sixteen bar noises are introduced in the horizontal direction. However, the generation of the above bar noise can be compensated by use of a known dropout compensation device, and no undesirable effects are introduced in the reproduced picture.

According to the present embodiment of the invention, reproduction can quickly be performed in terms of frames by a simple manual operation of the manipulation part 106 of the manipulation switch 72, and the operation thereof will now be described. As described above, when the operator releases the manipulation switch 72 after operating the manipulation switch 72, the reproducing apparatus performs a still-motion reproduction. A signal corresponding to the state indicated by the Gray code "0,0,0,1" in FIG. 8 is obtained, by rotating the manipulation part 106 of the manipulation switch 72 unto a position indicated by a one-dot chain line 105*a* in FIG. 7 to short-circuit the fixed contact parts 103*a* and 104*a*. Accordingly, the micro-computer 71 immediately and successively produces a positive polarity pulse and a negative polarity pulse, in order to obtain the kick pulse. In addition, the micro-computer 71 then generates a kick pulse for kicking the reproducing stylus 31 towards the outer peripheral direction of the disc 11 every one rotation of the disc 11, a total of fifteen times, to repetitively reproduce the same track sixteen times.

Therefore, the reproducing stylus 31 is immediately kicked towards the inner peripheral direction of the disc 11 by the operation of the manipulation switch 31, to repetitively reproduce the same track sixteen times. Thus, reproduction in terms of frames can be performed immediately by the operation of the manipulation switch 31.

In order to perform reproduction in terms of frames towards the outer peripheral direction of the disc 11, the manipulation switch 72 is operated so that a signal corresponding to the Gray code "1,0,0,0" in FIG. 8 is obtained, by similar operations as those performed in the above described case.

Further, this invention is not limited to these embodiments but various variations and modifications may be made without departing from the scope of the invention.

What is claimed is:

1. A reproducing apparatus for performing a special reproduction of recorded information signals picked up from a rotary recording medium on which the information signals are recorded in spiral track turns or in concentric tracks by use of a reproducing stylus, said rotary recording medium having a reference signal recorded for each track turn at positions which are aligned along a radial direction thereof and at least one vertical synchronizing signal for each track turn, said reproducing stylus being forcibly moved to change the reproducing track responsive to a generation of an external control signal, said reproducing apparatus comprising:

detector means for generating a rotation detection signal having a frequency which is proportional to a rotational speed of said rotary recording medium;

special reproduction synchronizing signal generator means for generating a special reproduction synchronizing signal, said special reproduction synchronizing signal generator means comprising a voltage controlled oscillator having an output oscillation frequency controlled by an output signal frequency of said detector means, and means for frequency-dividing the output of said voltage controlled oscillator under control of the reference signal and for generating the special reproduction synchronizing signal in synchronism with the reference signal, said generated special reproduction synchronizing signal being a pulse series having a specific positional relationship with respect to the recorded position of the reference signal for one track turn of the rotary recording medium and having a frequency which is higher than the frequency of the vertical synchronizing signal;

external control signal generator means for generating an external control signal responsive to a signal obtained by variably controlling the frequency of said special reproduction synchronizing signal; and manual switch means for varying the frequency of said special reproduction synchronizing signal via said external control signal generator means responsive to an output code signal respectively corresponding to positions of said manual switch means when released, said manual switch means being positioned at a predetermined neutral position to produce said external control signal once every one rotation of said rotary recording medium to repetitively reproduce the same track, said manual switch means varying the frequency of said external control signal to vary at predetermined steps a speed of picture motion produced by the reproduced information signal corresponding to positions of said manual switch means other than said predetermined neutral position.

2. The reproducing apparatus as claimed in claim 1 in which said manual switch means produces a digital signal determined by a Gray code according to the connected position of said manual switch means, and said neutral position of said manual switch means repetitively selecting and reproducing the same track so that said neutral position corresponds to a state where each bit of said Gray code is of the logical value "0".

3. The reproducing apparatus as claimed in claim 1 in which said manual switch means can be rotated clockwise and counterclockwise from said neutral position to one of many connected positions, to produce a digital signal which gradually increases the speed of picture motion as said manual switch means is rotated further from neutral position.

4. The reproducing apparatus as claimed in claim 3 in which said manual switch means produces a digital signal for forcibly moving said reproducing stylus in a forward direction when said manual switch means is rotated in one direction from said neutral position, and for forcibly moving said reproducing stylus in a reverse direction when said manual switch is rotated in an opposite direction from said neutral position.

5. The reproducing apparatus as claimed in claim 1 in which said manual switch means immediately generates said external control signal to perform a reproduction in terms of frames when said manual switch means is manually operated to an arbitrary connected position from said predetermined neutral position.

* * * * *